United States Patent Office 3,006,866
Patented Oct. 31, 1961

3,006,866
SYNTHETIC RESINS HAVING ANION-EXCHANGE PROPERTIES
Herbert Corte, Leverkusen, and Otto Netz, Koln, Germany, assignors to Farbenfabriken Bayer Aktiengesellschaft, Leverkusen, Germany, a corporation of Germany
No Drawing. Filed Dec. 2, 1958, Ser. No. 777,616
Claims priority, application Germany Dec. 2, 1957
17 Claims. (Cl. 260—2.1)

This invention relates to anion-exchange resins and more particularly to an improved and new process for making anion-exchange resins by procedure which involves reacting cross-linked vinyl aromatic polymers with a haloalkylimide.

It is known from U.S. patent specifications 2,591,573; 2,591,574; 2,616,099; 2,616,877; 2,629,710; 2,631,999; 2,632,000; 2,642,417; 2,725,361; 2,794,785; 2,597,439 and 2,597,440 that synthetic resins having anion-exchange properties may be obtained by introducing halogenalkyl groups into cross-linked polymers produced from aromatic vinyl compounds, and by reacting the resulting haloalkylated insoluble copolymers with an amine. If, in carrying out such a process, ammonia is introduced in the second stage of reaction, secondary reactions occur to a considerable degree with the formation of products having secondary or tertiary amino groups, so that it is not possible to produce derivatives of the said cross-linked polymers which contain exclusively primary aminoalkyl groups.

In order to overcome this difficulty, the said halogenoalkylated cross-linked polymers have already been reacted with potassium phthalimide to form the corresponding phthalimido compounds, which are then saponified to the corresponding aminoalkyl derivatives. This process, however requires three stages for the introduction of the aminoalkyl groups, namely, 1) the introduction of the halogenoalkyl groups, 2) the reaction with potassium phthalimide and 3) the saponification of the resulting products.

It has now been found that synthetic resins having anion-exchange properties can be obtained in a substantially simpler manner if cross-linked benzene insoluble organic polymers containing aromatic nuclei the carbon atoms of which constitute the major proportion of the total number of the carbon atoms of the polymer are condensed in the presence of a swelling agent and of a Friedel-Crafts catalyst with a N-(halogenoalkyl)-imide and the resulting products are saponified.

It has also been found that the synthetic resins obtained by the present process have a noticeably higher anion-exchange capacity than the products obtained by the known process. The reason for this may be that the known processes, which include the halegenoalkylation, cause additional cross-linking effects due to the halogenoalkyl groups which are introduced reacting further with aromatic nuclei. As a result, some of the chloralkyl groups introduced are obviously lost for the purpose of the intended amination, since it is known that insoluble, i.e., cross-linked, products, are formed when polystyrenes which are not cross-linked are halogenoalkylated, as for example with chloromethyl ether and aluminum chloride.

The introduction of aminoalkyl groups by means of chloromethyl phthalimide into aromatic hydrocarbons of low molecular weight, such as for example benzene or naphthalene, certainly constitutes a known reaction, but it was not to be expected that it would be possible to transfer this reaction to cross-linked insoluble polymers containing aromatic nuclei and that, in addition, it would be possible in this way to produce anion-exchangers having a capacity substantially higher than that of the aforementioned known exchangers. Whereas the capacity of the anion-exchangers obtained by the previously known process from the halogenoalkyl compounds by amination is in the region of 1.3 to max. 1.5 meq./cm.$^3$, anion exchangers with capacities from 1.7 to 2.5 meq./cm.$^3$ are obtained by the process of the invention.

The cross-linked polymers containing aromatic nuclei as used for carrying out the present process, are known per se. Especially to be considered for this purpose are copolymers of a predominant proportion of at least one aromatic monovinyl compound, such as for example styrene, substituted styrene (such as vinyl toluene, ethylstyrene) or vinyl naphthalene, and a subordinate proportion of a polyethylenically unsaturated cross-linking agent preferably divinyl benzene, furthermore, a substituted divinyl benzene (trivinylbenzene, divinyltoluene) divinylxylene, divinylethylbenzene, divinylether, ethyleneglycol dimethacrylate, ethyleneglycol diacrylate, diallylmaleate, a polyester of polyhydric alcohol and an olefinically unsaturated carboxylic acid, such as for example ethylene glycol and maleic acid. These copolymers can have both a gel structure and a sponge structure. The amount of cross-linking agent may vary within wide limits.

In case of copolymers having a gel structure amounts of about 0.5 to 15 percent by weight of cross-linking agent as calculated on the amount of total monomers and in the case of copolymers having a sponge structure amounts of about 0.5 to 30 percent by weight are preferably used. Such copolymers are described in, for example, the above cited United States patent specifications and in our co-pending application Serial No. 718,989, filed March 4, 1958.

As halogenoalkylimides there come into question the N-halogenoalkyl derivatives of the cyclic imides of organic dicarboxylic acids, such as phthalic acid, diglycolic acid, succinic acid as for instance the N-chloromethyl succinimide, N-bromomethylphthalimide, N-chloromethyl phthalimide, N-chloromethyl diglycolic acid imide. SnCl$_4$, ZnBr$_2$, ZnCl$_2$, AlCl$_3$ and concentrated sulfuric acid are examples of compounds which can be used as Friedel-Crafts or haloalkylation catalysts.

Examples of suitable swelling agents are liquid halogenated hydrocarbons, such as ethylene chloride and methylenechloride, carbontetrachloride, sym. tetrachloroethane, trichloroethylene, 1,1,2-trichloroethane, tetrachloroethylene, ethylenedibromide, dichloropropanes, pentachloroethane, trichloropropanes, tetrachloropropanes, pentachloropropanes, 1,2,3,3-tetrachloropropylene, tribromoethylene. Mixtures of these solvents may also be used.

The reaction of the said copolymers with the cyclic N-(halogenoalkyl)-imides can be effected, for example, by reacting said components in the presence of a swelling agent and a Friedel-Crafts catalyst at an elevated temperature, and preferably at the boiling point of the swelling agent (about 30° C. to 150° C.) until the splitting off of hydrogen halide is completed. The halogenoalkylimides are advantageously employed in quantities of about 1 to 5 moles of halogenoalkylimido per 2 moles of the aromatic nuclei present in the copolymer. The catalysts may be applied in quantities ranging from about 5 to 50 percent as calculated on the weight of polymers. The swelling agents serve to swell the polymers and to dissolve the halogenoalkylimides.

The cross-linked water and benzene-insoluble polymers thus produced contain structural units of the formula

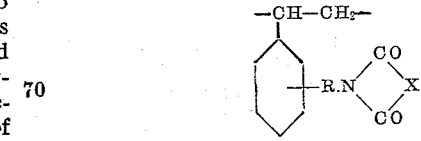

in which R stands for a lower bivalent aliphatic group such as methylene, ethylene, propylene, butylene, preferably methylene, and X stands for a bivalent organic radical, such as a benzene nucleus to which the CO-groups are bonded, in ortho-position, a bivalent lower aliphatic group such as ethylene, propylene, a

—$CH_2.O.CH_2$— or a —$CH_2.S.CH_2$ group.

In order to saponify the imidoalkyl derivatives formed, as intermediates, it is possible to use the known processes, such as for example alkaline or acid hydrolysis, or conversion with hydrazine and subsequent acid hydrolysis in the presence or absence of solvents or swelling agents.

To effect saponification the intermediate may be separated from the reaction medium, for instance by sucking off, washed with swelling agent to remove residual catalysts and halogenoalkylimides. If desired, the isolated product may be dried or washed with an organic solvent which is miscible with water such as methanol, ethanol, propanol, dioxane, tetrahydrofurane. Thereafter, the isolated product is saponified by reacting it at temperatures ranging between about 100 to 250° C. in an autoclave with an about 5 to 40 percent aqueous or alcoholic solution of an alkaline agent such as sodiumhydroxide, potassiumhydroxide or with an about 5 to 80 percent aqueous solution of a mineral acid such as hydrochloric, hydrobromic, sulfuric acid. Furthermore, the intermediate may be reacted with an about 5 to 50 percent aqueous or alcoholic solution of hydrazine hydrate at temperatures of about 50 to 100° C., said solution preferably containing in addition other alkaline agents such as caustic alkalis in amounts of about 1 to 20 percent. The reaction product may be isolated, washed with water and heated with an aqueous solution of a mineral acid of about 5 to 20 percent to complete hydrolysis. The hydrolyzing agents are normally employed in a molar surplus over the intermediate products to be hydrolyzed products may be isolated from the reaction medium and washed with dilute aqueous solution of caustic alkalis and thereafter with water until the wash-water remains neutral.

The reaction products can thereafter be alkylated, it being possible for this purpose to use alkylation agents which are known per se, for example alkyl halides (methyl-, ethyl-, propyl-, butyl-chloride, bromide or iodide), dialkyl sulphates (dimethylsulphate, diethylsulphate), alkylene oxides (ethylene oxide, propyleneoxide), halohydrins (ethylene chlorohydrin, propylenechlorohydrin, glycerolchlorohydrin), polyhalogen compounds (ethylenechloride, ethylenebromide, 1,4-dibromobutane, glyceroldichlorohydrin) or epihalohydrins (epichlorohydrin, epibromohydrin).

The alkylation is effected by reacting the aforementioned amino derivatives with the alkylating agents which are preferably in a molar surplus at temperatures of about 20 to 125° C. if necessary in the presence of a diluent such as water, alcohol (methanol, ethanol) and of an alkaline agent such as caustic alkalis (NaOH, KOH), MgO, CaO, organic bases. Depending on the quantity of alkylating agent applied there result secondary, tertiary or quaternized amino derivatives or mixtures thereof. A further suitable alkylating agent is a mixture of formaldehyde and formic acid which may be applied in the form of an aqueous solution containing in addition, if necessary, a mineral acid. The reaction with this alkylating agent may be carried through at temperatures of about 80 to 120° C. In this case tertiary amino derivatives are obtained as sole reaction products if the alkylating agents are applied in an excess over the equivalent amount. The tertiary amino derivatives thus obtained may be transformed into quaternary derivatives by reacting the first mentioned compounds with the alkyleneoxides and/or halohydrins as defined above at temperatures of about 10 to 120° C. in the presence of a diluent such as water, alcohol containing an alkaline agent or a weak acid, such as acetic acid, carbonic acid.

It is possible in this wall to obtain strongly as well as weakly basic anion-exchangers which also have a distinctly higher capacity than the known anion-exchangers which are formed by amination of halogenoalkyl derivatives of cross-linked polystyrenes.

*Example 1*

624 g. of styrene, 42 g. of divinyl benzene, 34 g. of ethyl styrene and 5 g. of benzoyl peroxide are suspended while stirring in 1200 cc. of water containing 0.1 percent of methyl cellulose and heated, while stirring, for 8 hours to 65 to 70° C. and thereafter for 2 hours to 90° C. After cooling to below 50° C., the pearl polymer which is formed is filtered with suction, washed several times with water and dried in vacuo at 100 to 110° C.

100 g. of the pearl polymer are swelled in a solution of 30 g. of tin tetrachloride in 300 cc. of ethylene chloride. The mixture is heated to boiling point and 200 g. of N-(chloromethyl)-phthalimide are introduced in small portions within 4 hours. The mixture is boiled under reflux until the evolution of hydrochloric acid ceases (about 6 hours) and then cooled to below 30° C. The reaction liquid is filtered with suction, whereupon the pearls are washed twice with ethylene chloride and tetrahydrofurane and dried by suction. The pearls are then boiled for 6 hours under reflux with 300 cc. of water, 16 g. of caustic soda and 64 g. of hydrazine hydrate, again filtered with suction, washed with water and thereafter boiled for 6 hours under reflux with 500 cc. of 10 percent hydrochloric acid, phthalylhydrazide being precipitated, which is washed out with dilute sodium hydroxide solution. After being treated with excess 5 percent hydrochloric acid and then water, 460 cc. of an anion exchanger (cross-linked polyaminomethyl styrene hydrochloride) are obtained having after regeneration with NaOH and washing a binding capacity for HCl of 1.98 g. equivalents as calculated per litre of resin in the hydrochloride form.

For conversion into a strongly basic anion exchanger, 460 cc. of the hydrochloride are suspended in 1500 cc. of a 10 percent aqueous NaOH solution and treated while stirring at 40 to 45° C. with methyl chloride under a pressure of at least an atm. gauge until saturation point is reached. After filtering the reaction solution with suction and washing with 5 percent hydrochloric acid and water, 500 cc. of the chloride form of a strongly basic anion exchanger with an anion exchange capacity of 1.82 g. equivalents per litre of chloride form are obtained.

*Example 2*

624 g. of styrene, 42 g. of divinyl benzene, 34 g. of ethyl styrene, 490 g. of white spirit (B.P. 160–196° C.) and 5 g. of benzoyl peroxide are mixed and suspended while stirring in 1200 cc. of water containing 0.1 percent of methyl cellulose. The suspension is heated, while constantly stirring, for 8 hours to 65 to 70° C. and thereafter heated for 2 hours to 90° C. and then cooled to 50° C. The pearl polymer which is formed and which has a sponge structure is filtered with suction, washed several times with water and dried in vacuo at 100–110° C. 100 g. of this pearl polymer are heated to boiling point with 30 g. of freshly dehydrated zinc chloride and 300 cc. of ethylene chloride. 200 g. of N-(chloromethyl)-phthalimide are introduced in small portions into the boiling mixture within approximately 3–5 hours and the mixture is boiled until the evolution of hydrochloric acid has ceased. After cooling to below 30° C., the reaction liquid is filtered with suction. The remaining pearls are washed twice with ethylene chloride and then with dioxane. The pearls dried by suction are then heated together with 800 cc. of a 14 percent aqueous sodium hydroxide solution for 10 hours at 170 to 180° C. After cooling, the reaction liquid is filtered with suction and the pearls are washed several times with water and then with dilute hydrochloric acid. 450 cc. of cross-linked polyaminomethyl styrene hydrochloride with an HCl combining power of 1.91 g. equivalents per litre of hydrochloride are obtained; the product is opaque and has a sponge structure. The treatment of the weakly basic anion-exchanger thus obtained, with methyl chloride, using the process described in Example 1, yields 490 cc. of a strongly basic anion-exchanger with a sponge structure and having an anion-exchange capacity of 1.73 g. equivalents per litre in the chloride form.

*Example 3*

500 g. of diglycolic acid imide (melting point 142–143° C.) prepared by destillation of diglycolic acid which is neutralized with ammonia are dissolved with heating in 450 ml. of an aqueous formaldehyde solution (40 percent by volume) and concentrated in vacuum at 40–45° C. The resulting hydroxymethyl-diglycolic imide is crystallized by cooling with ice; melting point 83–84° C.; yield 500 g.

175 g. of the hydroxymethyl-diglycolic-imide are suspended in 400 ml. of ethylene chloride and reacted with 150 g. of thionylchloride. The mixture is stirred with heating until the hydroxy compound has been transformed into the chloromethylderivative. After destilling off the excess thionyl-chloride 100 g. of a cross-linked polystyrene resin (a pearl copolymer of 90 parts by weight of styrene, 4 parts by weight of ethylstyrene and 6 parts by weight of divinylbenzene) are introduced into the solution and 20 g. of tin tetrachloride added as a catalyst; condensation is carried out until the evolution of HCl gas is finished.

The resinous condensation product is washed with ethylene chloride and twice with methanol and then boiled with an excess of dilute sodium hydroxide solution for 6 hours, subsequently with an excess of diluted hydrochloric acid for another 6 hours, in order to split off the diglycolic acid.

350 ml. of an anion-exchange resin containing primary amino groups, having an anion-exchange capacity of 1.9 equivalents per litre of resin in the hydrochloride form are obtained.

*Example 4*

194 g. of N-hydroxymethyl-succinimide are suspended in 400 ml. of ethylene-chloride, reacted with 180 g. of thionyl-chloride and heated until the evolution of the HCl and $SO_2$ gas has ceased. 100 g. of the polystyrene resin of Example 3 are introduced into the resulting solution of N-chloromethyl-succinimide and 20 g. tin tetrachloride are added to the mixture as catalyst. The mixture is then heated until the HCl evolution is complete, the reaction product filtered off with suction, washed with ethylene chloride and subsequently with methanol and finally heated to the boil for saponification with an excess of dilute sodium hydroxide solution and subsequently with an excess of dilute hydrochloric acid. 250 ml. of an anion-exchanger having a HCl-binding capacity of 1.7 equivalents per litre of resin in the hydrochloride form are obtained.

*Example 5*

300 g. of the polystyrene resin of Example 3 are introduced into a solution of 1635 g. of N-chloromethyl-phthalimide in 2000 ml. of ethylene chloride, and 50 ml. of concentrated sulfuric acid are added. The mixture is refluxed until the evolution of the HCl gas has ceased. The condensation product obtained is washed with ethylene chloride and subsequently twice with methanol and then heated with 300 ml. of 12 percent hydrazine hydrate solution and 600 ml. of 45 percent sodium hydroxide solution to 95–100° C. for 12 hours in order to split off the phthalic acid residue, then filtered off with suction and heated with 2200 ml. of 10 percent hydrochloric acid to 95° C. for 6 hours. The resin is filtered off with suction and washed with dilute sodium hydroxide solution. After treating with excess 5 percent hydrochloric acid 1400 ml. of a weakly basic anion-exchanger having a HCl-binding capacity of 2.0 equivalents per litre of resin in the hydrochloride form are obtained.

*Example 6*

1150 g. of N-hydroxymethyl-phthalimide are stirred with 2750 ml. of concentrated hydrochloric acid (minimum concentration 37 percent) at 50–55° C. for 2 hours, N-chloromethyl-phthalimide precipitates in the form of a fine suspension. The suspension is stirred with 1300 ml. of ethylene chloride at 50° C. until the components have completely dissolved and 2 layers are formed on cooling which can easily be separated from each other. After separation the solution of ethylene chloride and chloromethyl-phthalimide is distilled until the boiling temperature measured in the descending condenser reaches 84° C. and the last traces of moisture have azeotropically distilled over. 250 g. of the polystyrene resin of Example 3 are introduced into the solution cooled to 50° C. and 50 g. of tin tetrachloride are added as catalyst. The mixture is heated, finally under reflux, until the evolution of HCl gas has ceased. The resinous condensation product is filtered off with suction, washed with ethylene chloride and subsequently twice with methanol.

The phthalic acid residue is split off by heating the resinous condensation product with a mixture of 1400 ml. of an aqueous 24 percent hydrazine hydrate solution and 360 ml. of an aqueous 45 percent sodium hydroxide solution to 90–95° C. for 12 hours, subsequently with 1100 ml. of 20 percent aqueous hydrochloric acid at 95–100° C. for 6 hours. The resulting anion-exchange resin is filtered off with suction, washed with water and dilute sodium hydroxy solution and neutralized with dilute hydrochloric acid. 1325 ml. of a slightly basic exchanger having a HCl-binding capacity of 2.5 equivalents per ltr. in the hydrochloride form are obtained.

*Example 7*

1500 ml. of the slightly basic exchange resin obtained according to Example 5 are converted into the OH-form by treating with a dilute aqueous NaOH-solution and then heated with a mixture of 600 ml. of an aqueous formaldehyde solution (40 percent per volume) and 600 ml. of formic acid (90 percent), finally under reflux, until the evolution of $CO_2$ gas is finished. The resinous condensation product obtained is filtered off with suction, washed with water, then with dilute sodium hydroxide solution and once more with water and then treated with excess dilute hydrochloric acid. 1600 ml. of a slightly basic exchange resin with tertiary amino groups and having a HCl-binding capacity of 1.75 equivalents per litre of resin in the hydrochloride form are obtained.

*Example 8*

The resin obtained as described in Example 6 is converted into the OH-form with dilute aqueous sodium hydroxide solution and heated with a mixture of 500 ml. of water, 500 ml. of ethylene chlorohydrine (2-chloroethanol) and 140 ml. of an aqueous 45 percent sodium hydroxide solution at 50–60° C. for 18 hours. After filtering with suction and washing 1625 ml. of a strongly basic anion-exchange resin having a capacity of 1.73 g. equivalents per litre of resin in the hydrochloride form are obtained (splitting capacity for neutral salt 1.43 equivalents per litre of resin in the hydrochloride form).

*Example 9*

1060 ml. of an anion-exchange resin prepared according to Example 5, which contains primary amino groups are heated with a mixture of 250 ml. of water, 450 ml. of formaldehyde solution (40 percent per volume), 70 ml. of concentrated sulfuric acid and 250 ml. of formic acid (90 percent), at last under reflux, until the evolution of $CO_2$ gas is finished. The resinous condensation product is filtered off with suction, washed with sodium hydroxide solution and water and neutralized with dilute hydrochloric acid. The anion-exchange resin thus obtained contains only tertiary amino groups. Yield 1140 ml.; HCl-binding capacity 1.9 equivalents per litre of resin in the hydrochloride form.

*Example 10*

750 ml. of the exchange resin of Example 9 containing tertiary amino groups which are present in the OH-form are treated with 300 ml. of $H_2O$ and 25 ml. of concentrated $H_2SO_4$. A stream of ethyleneoxide is passed through the mixture at 30° C. After the absorption of 120 g. of ethylene oxide the gas stream is stopped, the resin obtained filtered off with suction and washed with water. 1345 ml. of a strongly basic exchange resin having an exchanging capacity of 1.6 g. equivalents per litre in the hydrochloride form are obtained (splitting capacity for neutral salts: 1.2 equivalents per litre in the hydrochloride form).

What we claim is:

1. A process of producing a water-insoluble anion-exchange resin which comprises reacting in swollen form a benzene-insoluble cross-linked unsubstituted polymer of an aromatic vinyl hydrocarbon with a cyclic N-(halogenoalkyl)imide at an elevated temperature to introduce into said polymer at least 1 N-alkyl cyclic imide group per 2 aromatic nuclei, said N-alkyl cyclic imide being reacted with said polymer in an amount of at least 0.5 molecular proportion of imide per aromatic nucleus in the polymer, and then hydrolyzing the resulting product so as to effect saponification of the N-alkyl cyclic imide groups introduced into the polymer.

2. Process of claim 1 wherein the reaction of said polymer with said N-(halogenoalkyl)imide is conducted in the presence of a Friedel-Crafts catalyst.

3. Process of claim 1 wherein said benzene-insoluble cross-linked organic polymer is a copolymer of a major amount of an aromatic monovinyl hydrocarbon cross-linked with a minor amount of a polyethylenically unsaturated cross-linking agent.

4. Process of claim 1 wherein said cyclic N-(halogenoalkyl)imide is the N-halogenoalkyl imide derivative of the cyclic imide of an organic dicarboxylic acid.

5. Process of claim 1 wherein the saponified polymer is alkylated at a temperature of about 20–125° C.

6. A process of producing a water-insoluble anion-exchange resin which comprises (1) contacting a cross-linked copolymer of a monovinyl hydrocarbon aromatic monomer and of a polyethylenically unsaturated cross-linking agent, which copolymer contains aromatic nuclei, the carbon atoms of which constitute the major proportion of the total number of the carbon atoms of the copolymer, at about 30–150° C. with a Friedel-Crafts catalyst and at least 0.5 molecular proportion per aromatic nucleus in the copolymer of a cyclic imide of the general formula:

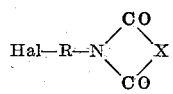

to introduce into said copolymer per 2 aromatic nuclei at least one radical of the general formula:

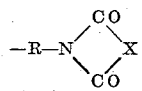

in which formulae Hal stands for a halogen atom, R for a lower bivalent aliphatic group, X for a bivalent organic radical selected from the group consisting of an ortho-condensed benzene nucleus, ethylene, propylene, a —$CH_2.O.CH_2$—, and a —$CH_2$—S—$CH_2$— group, and (2) subjecting the reaction product thus obtained to hydrolysis to transform said radical into a —R—$NH_2$ radical.

7. A process according to claim 6, wherein said cyclic imide is an N-(halomethyl) phthalimide.

8. A process according to claim 6, wherein said copolymer is a copolymer of a monovinyl benzene hydrocarbon and 0.5 to 30% by weight of divinyl benzene.

9. A process according to claim 6, wherein said copolymer has a spongy structure.

10. A process according to claim 6, wherein said step (1) is carried through in the presence of an inert organic swelling agent for said copolymer.

11. A process of producing a water-insoluble anion-exchange resin which comprises (1) contacting a cross-linked copolymer of a monovinyl hydrocarbon aromatic monomer and of a polyethylenically unsaturated cross-linking agent, which copolymer contains aromatic nuclei, the carbon atoms of which constitue the major proportion of the total number of the carbon atoms of the copolymer, at 30–150° C. with a Friedel-Crafts catalyst and at least 0.5 molecular proportion per aromatic nucleus in the copolymer of a cyclic imide of the general formula:

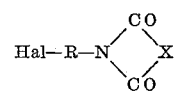

to introduce into said copolymer per 2 aromatic nuclei at least one radical of the general formula:

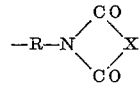

in which formulae Hal stands for a halogen atom, R for a lower bivalent aliphatic group, X for a bivalent organic radical selected from the group consisting of an ortho-condensed benzene nucleus, ethylene, propylene, a —$CH_2.O.CH_2$—, and a —$CH_2$—S—$CH_2$— group, (2) subjecting the reaction product thus obtained to hydrolysis to transform said radical into an —R—$NH_2$ radical, and (3) and contacting said hydrolysis product at a temperature of about 20–125° C. with an alkylating agent selected from the group consisting of an alkyl halide, a dialkyl sulphate, an alkylene oxide, a halohydrin, an epihalohydrin, an aliphatic dihalogeno compound, and a mixture of formaldehyde and formic acid.

12. A process according to claim 11, wherein said cyclic imide is an N-(halomethyl) phthalimide.

13. A process according to claim 11, wherein said copolymer is a copolymer of a monovinyl benzene hydrocarbon and 0.5 to 30% by weight of divinyl benzene.

14. A process according to claim 11, wherein said copolymer has a spongy structure.

15. A process according to claim 11, wherein said step (1) is carried through in the presence of an inert organic swelling agent for said copolymer.

16. A benzene-insoluble cross-linked organic polymer of aromatic vinyl hydrocarbons containing aromatic nuclei, the carbon atoms of which constitute the major proportion of the total number of the carbon atoms of the polymer, said polymer having bonded per 2 aromatic nuclei at least one cyclic imide group, the nitrogen atom of which is connected to an aromatic nucleus of said polymer by way of an alkylene group.

17. A benzene-insoluble cross-linked organic polymer of aromatic vinyl hydrocarbons containing aromatic nuclei, the carbon atoms of which constitute the major proportion of the total number of the carbon atoms of the polymer, said polymer having bonded per 2 aromatic nuclei at least one radical of the formula:

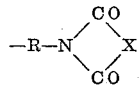

wherein R stands for an alkylene group and X for a bivalent organic radical completing a 5-6 membered cyclic imide nucleus, said bivalent organic radical being selected from the group consisting of phenylene, alkylene, alkylene interrupted by an oxygen atom, and alkylene interrupted by a sulfur atom.

References Cited in the file of this patent

UNITED STATES PATENTS 2,629,710   McBurney _____ Feb. 24, 1953

OTHER REFERENCES

Hickinbottom: "Reactions of Organic Compounds," Longmans (1948), pp. 256–258.